US005776379A

United States Patent [19]

Bowles

[11] Patent Number: 5,776,379

[45] Date of Patent: Jul. 7, 1998

[54] CARBURETOR ADJUSTMENT SCREW APPARATUS

[75] Inventor: Roger Bowles, Tralee, Ireland

[73] Assignee: Barcarole Limited, Cork, Ireland

[21] Appl. No.: 799,503

[22] Filed: Feb. 12, 1997

[30] Foreign Application Priority Data

Mar. 26, 1996 [IE] Ireland .................................. S960247

[51] Int. Cl.[6] ............................ F02M 3/08; F16K 35/10

[52] U.S. Cl. .................... 261/71; 137/382; 261/DIG. 38; 261/DIG. 84

[58] Field of Search .............................. 261/71, DIG. 38, 261/DIG. 84; 137/382

[56] References Cited

U.S. PATENT DOCUMENTS

| | | | |
|---|---|---|---|
| 3,618,906 | 11/1971 | Charron | 261/71 X |
| 4,097,561 | 6/1978 | Seki et al. | 261/DIG. 38 |
| 4,239,710 | 12/1980 | Sato | 137/382 X |
| 4,246,929 | 1/1981 | Wakeman | 261/DIG. 84 |
| 4,271,095 | 6/1981 | Maeda | 261/71 X |
| 4,349,489 | 9/1982 | Gaget et al. | 261/DIG. 38 |
| 5,252,261 | 10/1993 | Gerhardy | 137/382 X |
| 5,525,267 | 6/1996 | Araki | 261/71 |
| 5,630,965 | 5/1997 | Shaw et al. | 261/DIG. 84 |
| 5,635,113 | 6/1997 | Walsh et al. | 137/382 X |
| 5,667,734 | 9/1997 | Ohgane | 261/71 |
| 5,695,693 | 12/1997 | Koizumi et al. | 261/71 |

*Primary Examiner*—Richard L. Chiesa
*Attorney, Agent, or Firm*—Harness, Dickey & Pierce, P.L.C.

[57] ABSTRACT

A carburetor adjustment screw apparatus includes an adjusting screw (2) having a shaft (7) in screw threaded engagement with a carburetor body (4) and a head (8) by which the shaft may be rotated. A generally tubular open-ended housing (10) surrounds the head of the screw and a ring (11) is rotatably mounted in the open end of the housing. Stop means (19/20) limit the angular range of rotation of the ring. A plug (12) is mounted in the ring and engages the screw such that rotation of the plug effects corresponding rotation of the screw. The plug is movable relative to the ring between a first axial position wherein the plug can rotate independently of the ring and a second axial position wherein the plug engages the ring for co-rotation therewith such that the angular range of rotation of the plug is limited to the angular range of rotation of the ring.

6 Claims, 3 Drawing Sheets

CARBURETOR ADJUSTMENT SCREW APPARATUS

FIELD OF THE INVENTION

The present invention relates to an adjustment screw apparatus for adjusting fuel flow in a carburetor, for example a diaphragm-type carburetor.

BACKGROUND TO THE INVENTION

A diaphragm-type carburetor comprises a main body portion defining a carburetor mixing passage having an air intake side and an engine outlet side, fuel pump means, a throttle shutter mounted within the carburetor mixing passage between the air intake side and the engine outlet side, a throttle shaft for controlling the throttle shutter, and a metering chamber for supplying fuel from the fuel pump means into the carburetor mixing passage via a high speed adjusting screw and a low speed/idle adjusting screw.

In such a carburetor the volume of fuel delivered to the engine is adjustable, for low speed operation via the low speed/idle adjusting screw and for high speed operation via the high speed adjusting screw. Adjustment is factory set by the engine manufacturer to give the desired engine performance/air fuel ratios.

With such a system, adjustment can be made within a broad band from no fuel flow, when the adjustment needle is screwed fully in (i.e. the needle tip closes the orifice) to fully open, when the needle tip is fully out of the orifice. In this case the orifice diameter controls the maximum volume of fuel flow. This system allows the engine to be set to run on a very lean or very rich fuel mixture. More often the correct factory setting is re-adjusted by the end user. Such lean and rich conditions result in undesirable exhaust emissions.

With the advent of emission regulations applicable to IC engines and in particular to two-stroke engines which are regulated by the type of carburetor mentioned above it is necessary to have a system which limits the amount off adjustment on the low speed and high speed screw adjustment screws. It should also be possible for such a system to be adjusted and set after the carburetor has been assembled to a complete engine or a suitable end product such as typically, a chainsaw.

In particular with IC engine powered garden equipment, chainsaws etc., it is necessary for the manufacturer of the end product to final adjust set and certify air/fuel ratios to comply with emission regulations on each fully assembled unit prior to packing/shipping. This requires single point adjustment of the low and high speed screws, i.e. tuning each carburetor to each individual engine requirements prior to fixing the limits. It is not possible to achieve this with the above mentioned system.

It is an object of the present invention to provide a carburetor adjustment screw apparatus which allows these problems to be overcome.

SUMMARY OF THE INVENTION

According to the invention a carburetor adjustment screw apparatus comprises a screw member having a shaft in screw threaded engagement with a carburetor body and a head by which the shaft may be rotated, a generally tubular open-ended housing surrounding the head of the screw member, a ring member rotatably mounted in the open end of the housing, stop means limiting the angular range of rotation of the ring member relative to the housing, and a plug member rotatably mounted in the ring member and movable relative to the ring member between a first axial position wherein the plug member can rotate independently of the ring member and a second axial position wherein the plug member engages the ring member for co-rotation therewith such that the angular range of rotation of the plug member is limited to the angular range of rotation of the ring member, the plug member engaging the head of the screw member in both the first and second axial positions such that rotation of the plug member effects corresponding rotation of the screw member.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 2:
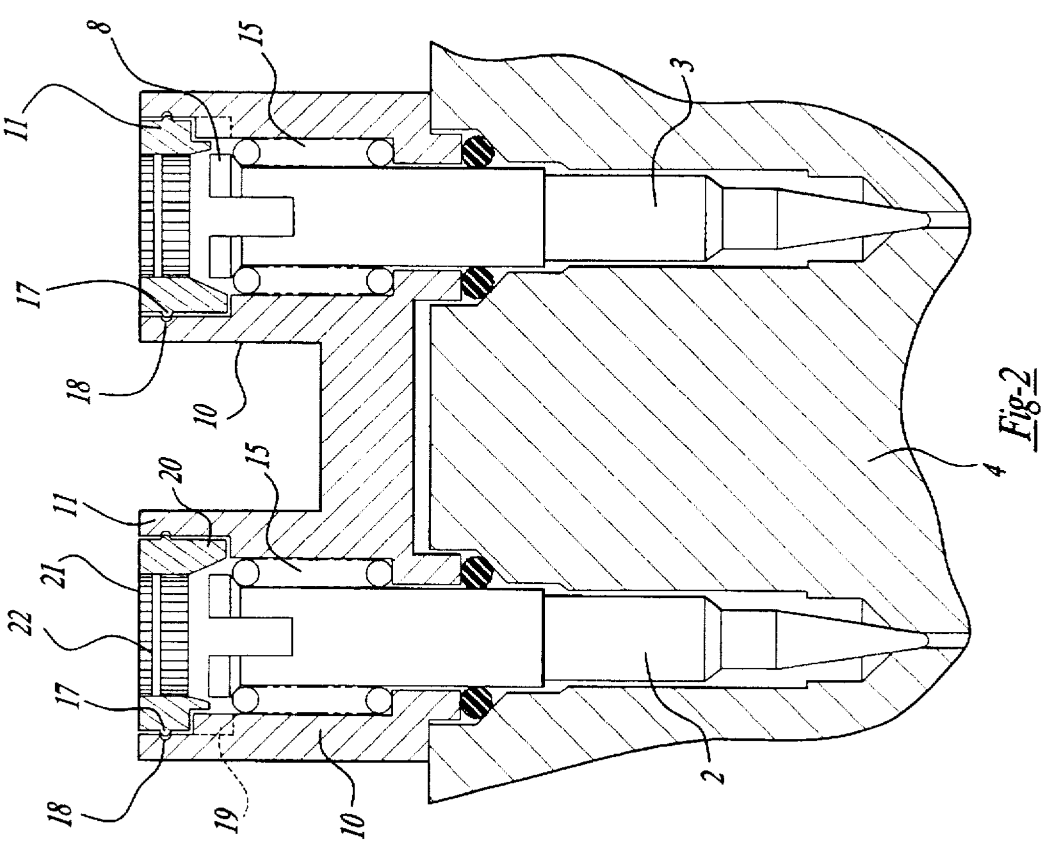
FIG. 2 is a view similar to FIG. 1 and including an adjustment ring rotatably mounted in the open end of each tubular housing.

Referring now to the drawings, high and low speed adjusting screws 2 and 3 respectively are in screw-threaded engagement with the body 4 of a diaphragm type carburetor and regulate the flow of fuel in the carburetor. Such screws are well-known and need not be described here in detail. Briefly, however, rotation of the screw 2 in the body 4 moves the conical tip 5 of the screw out of or into an orifice 6 of the carburetor body 4 (depending upon the direction of rotation) thereby increasing or decreasing the open area between the conical tip 5 and the orifice 6. This allows adjustment of fuel flow to a high speed nozzle (not shown) of the carburetor which in turn feeds fuel to an engine on which the carburetor body is mounted. The low speed adjusting screw 3 operates in precisely the same manner to adjust the fuel flow to a low speed/idle nozzle. Each screw 2, 3 has a shaft 7, of which the conical tip 5 forms the free end, and a head 8 having a screwdriver-type slot 9.

Figure 1:
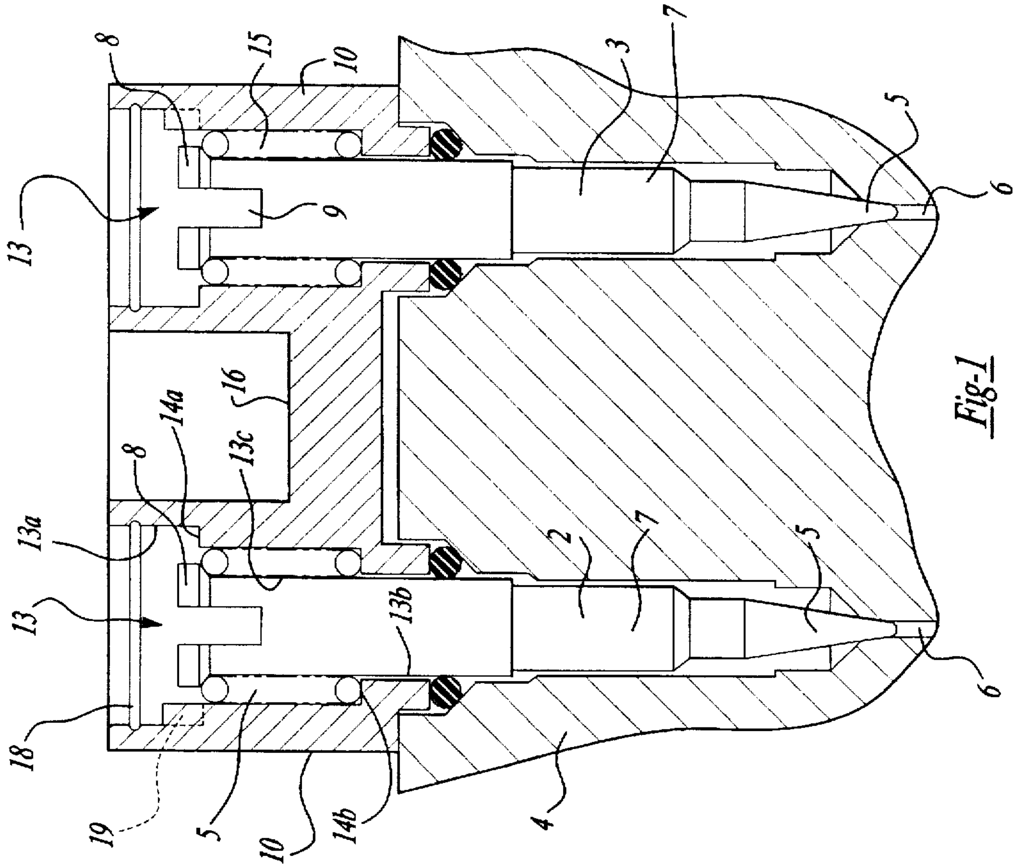
FIG. 1 is a side sectional view of a portion of a diaphragm carburetor having a pair of adjustment screws and a respective open-ended tubular limiter housing mounted over the exposed head of each adjustment screw.
Figure 4:
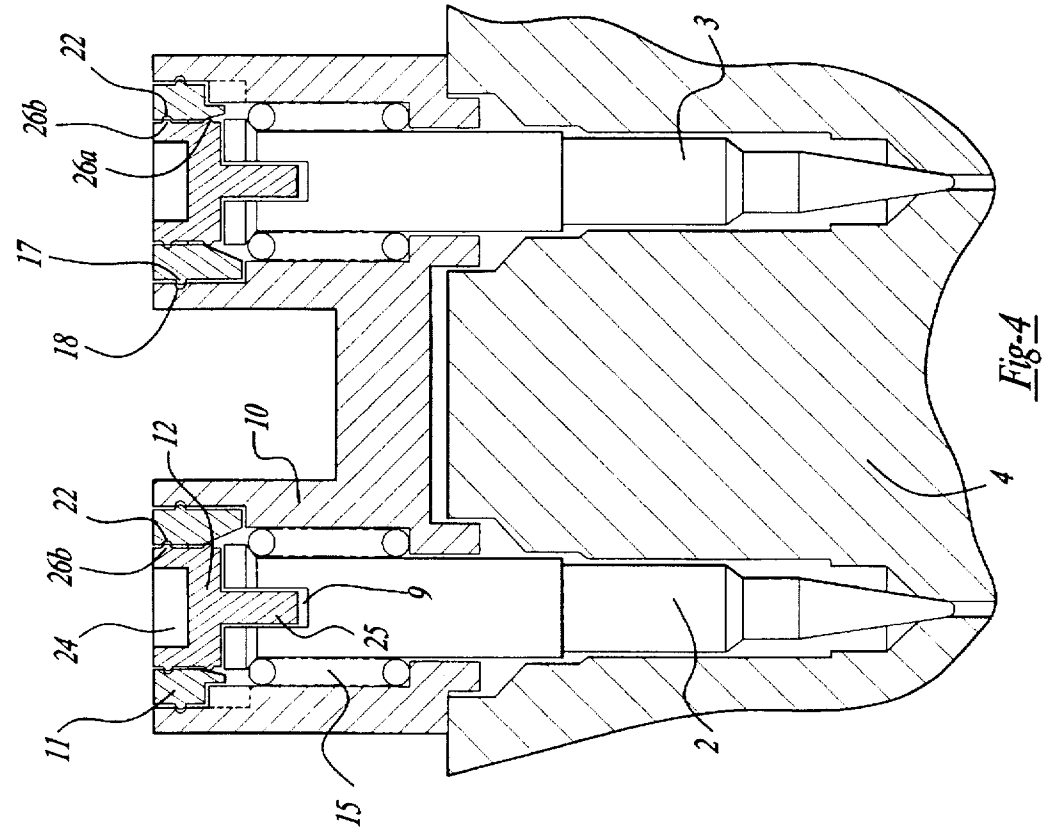
FIG. 4 is a view similar to FIG. 3 showing each adjustment plug in a second axial position relative to the adjustment ring, FIG. 5(*a*) is a plan view of the tubular housings of FIGS. 1 to 4, FIG. 5(*b*) is a cross-sectional view of the left hand tubular housing of FIG. 5(*a*) looking in the direction of the arrows B—B, FIGS. 6(*a*), 6(*b*) and 6(*c*) are cross-sectional, plan and side views respectively of one of the adjustment rings of FIGS. 2 to 4, and FIGS. 7(*a*), 7(*b*) and 7(*c*) are cross-sectional, plan and side views respectively of one of the adjustment plugs of FIGS. 3 and 4.
Figure 3:
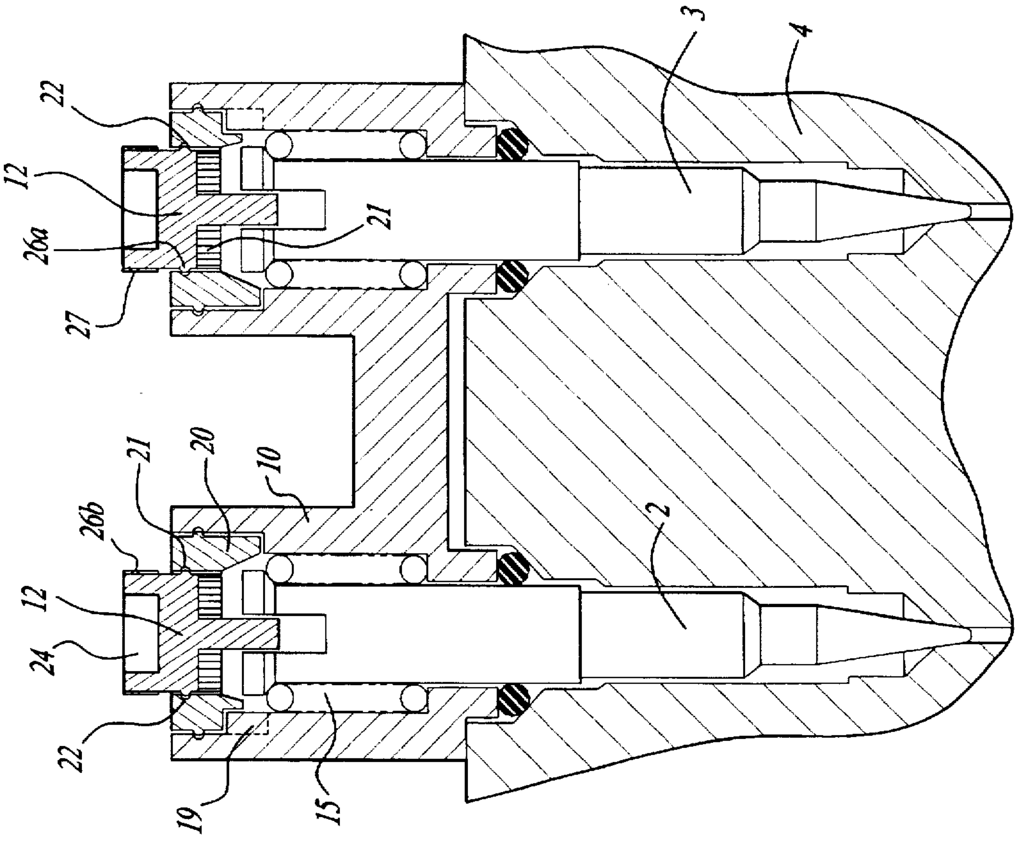
FIG. 3 is a view similar to FIG. 2 further including an adjustment plug mounted in each adjustment ring in a first axial position relative to the adjustment ring.
Figure 5A:
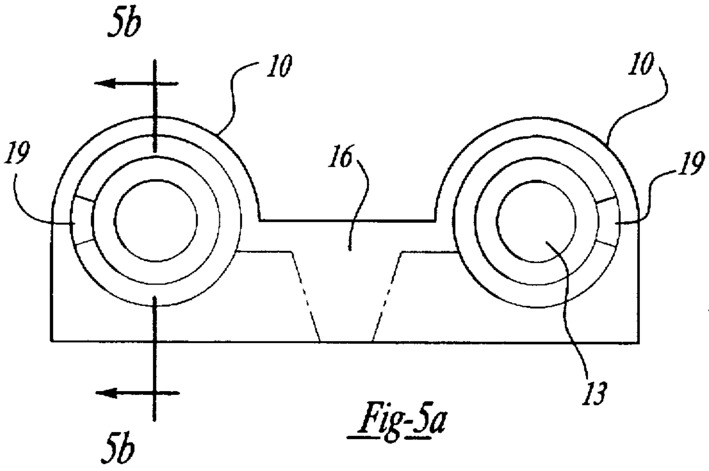
Figure 5B:
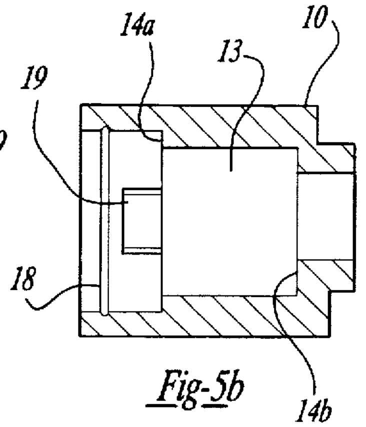
Figure 6A:
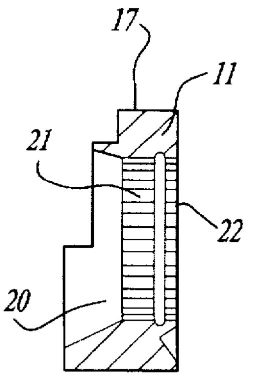
Figure 6B:
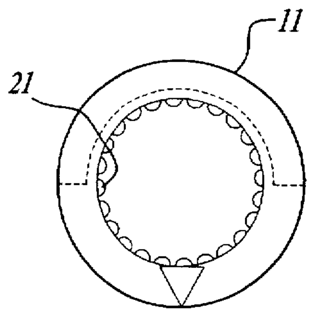
Figure 6C:
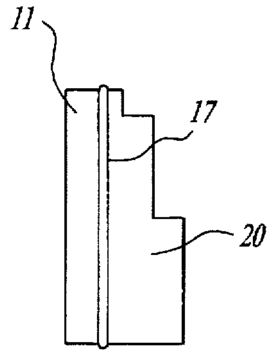
Figure 7A:
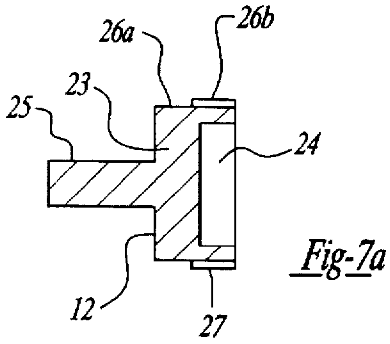
Figure 7B:
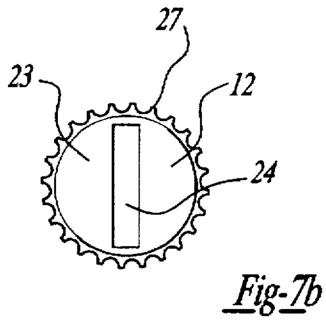
Figure 7C:
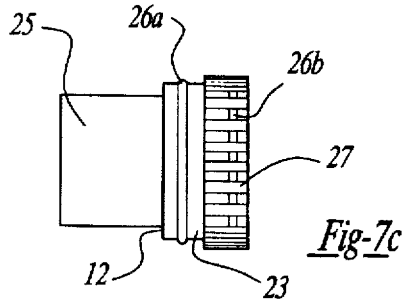

An adjustment limiting means is provided for each screw 2, 3 comprising an open-ended generally tubular housing 10, an adjustment ring 11 and an adjustment plug 12. FIGS. 1 and 2 show an incomplete adjustment limiting means in successive stages of assembly, while FIGS. 3 and 4 show the complete adjustment limiting means in two positions of use.

Since the adjustment limiting means for each screw 2, 3 is of identical mirror image construction and operation, only the adjustment limiting means associated with the high speed adjusting screw 2 will be described.

The tubular housing 10 surrounds the head 8 of the screw member 2 and has an internal bore 13 whose axis is substantially coaxial with the axis of rotation of the screw member 2. The internal diameter of the bore 13 is circumferentially stepped at 14*a* and 14*b* such that the portion 13*a* of the bore 13 at the open end of the housing 10 remote from the carburetor body 4 has a greater diameter than the main (central) portion of the bore 13*c* and the portion 13*b* of the bore 13 at the open end of the housing 10 which engages the carburetor body 4 has a lesser diameter than the central portion 13*c* of the bore 13.

A compression spring 15 acting between the head 8 of the screw member 2 and the step 14*b* maintains the housing 10 in position against the carburetor body 4 surrounding the head 8 of the screw member 2. To prevent rotation of the tubular housings 10 relative to the carburetor body 4 the two housings 10 surrounding the screw members 2 and 3 respectively are integrally joined by a web 16. The tubular housings 10 are moulded from plastics material.

The adjustment ring 11, which is likewise moulded from a plastics material, is pressed into the bore portion 13*a* of the housing 10 until an external circumferential projection 17 on the ring 11 comes to engage in a complementary circumferential groove 18 around the interior of the portion 13*a* of the bore 13. When the projection 17 and groove 18 are thus engaged the ring 11 is retained within the housing 10 but is able to rotate freely about an axis substantially coaxial with the axis of rotation of the screw member 2. It will be understood that the plastics material of which the housing 10 and ring 11 are made is capable of sufficient resilient deformation to permit the ring 11 to be pushed into the portion 13*a* of the bore 13 until the projection 17 and groove 18 come to engage as aforesaid.

An inward projection 19 is provided around part of the internal circumference of the bore portion 13*a*—this can alternatively be considered as an upward extension of part of the bore portion 13*c*—and a downward projection 20 is provided around part of the circumference of the ring 11. When the ring 11 is rotated in a clockwise direction, for example, one edge of the projection 20 will ultimately come to abut against one edge of the projection 19 and prevent further rotation of the ring 11 in that direction, and conversely when the ring 11 is rotated anti-clockwise the other edge of the projection 20 will ultimately come to abut against the other edge of the projection 19.

These projections 19, 20 therefore form a stop means which limits the angular range of rotation of the ring 11 relative to the housing 10. By appropriately selecting the angle subtended by each projection 19, 20 at the axis the angular range of rotation of the ring 11 one can be set at any desired value from close to zero to nearly 360 degrees. The adjustment ring 11 has an internal knurled surface 21 and an internal circumferential groove 22, for a purpose to be described.

The adjustment plug 12, also moulded from a plastics material, has a substantially circular body 23 with a screwdriver-type slot 24 in one surface and a flange 25 dependent from the opposite surface. The exterior surface of the body 23 further has a pair of axially spaced external circumferential projections 26*a* and 26*b* and an externally knurled surface 27 which, however, is confined to approximately one half the axial length of the body 23 and in particular does not extend to the circumferential projection 26*a*.

The plug 12 is pressed into the ring 11, flange 25 first, initially until the circumferential projection 26*a* comes to engage in the circumferential groove 22 in the ring 11 and the flange 25 comes to engage in the slot 9 in the head 8 of the screw member 2 in the manner of a screw driver. As before, the plastics material of which the plug 12 and ring 11 are made is capable of sufficient resilient deformation to permit the plug 12 to be pushed into the ring 11 until the projection 26*a* comes to engage in the groove 22. Further, the upper end of the projection 19 of the housing 10 (as seen in FIGS. 3 and 4) forms a bearing surface for the lower edge of the periphery of the ring 11 and the step 14*a* forms a bearing surface for the lower end of the projection 20, thereby preventing dislocation of the projection 17 from the groove 18 and thus preventing further movement of the ring 11 into the bore 13 under the pressure of inserting the plug 12 into the ring 11.

At this point the plug 12 is in the axial position shown in FIG. 3. In this first axial position of the plug 12 the knurled external surface 27 of the plug 12 does not engage the internal knurled surface 21 of the ring 11 and the plug 12 is able to freely rotate independently of the ring 11 about an axis substantially coaxial with the axis of rotation of the ring 11. Such rotation is not limited and the plug 12 can rotate by any angle less or greater than 360 degrees without constraint. Thus, since the flange 25 engages the slot 9 of the screw member 2, the screw member 2 can be rotated through any desired angle by inserting a screwdriver into the slot 24. In this axial position, therefore, the plug 12 allows the setting of the screw member 2 to be freely set by the manufacturer.

When the desired fuel flow has been set, the plug 12 is pressed further into the ring 11 so that the circumferential projection 26*a* is forced out of the groove 22 and the plug 12 moves axially towards the head 8 of the screw member 2 until the projection 26*b* comes to engage in the groove 22. In this second axial position of the plug 12 the knurled external surface 27 of the plug 12 now engages the internal knurled surface 21 of the ring 11 and the plug 12 and ring 11 are therefore locked together for co-rotation.

Thus in this axial position of the plug 12 the angular range of rotation of the plug 12, and hence of the screw member 2, is limited to the angular range of rotation of the ring 11, as determined by the projections 19 and 20. Accordingly, in this second axial position of the plug 12 the user is only permitted to adjust the fuel flow within the limits established by the projections 19 and 20 to prevent over rich or lean setting of the screw members 2 and 3. Further, the plug 12, when once pushed into the ring 11 to the second axial position, is very difficult to extract, and deters tampering with the adjustment.

I claim:

1. A carburetor adjustment screw apparatus comprising a screw member having a shaft in screw threaded engagement with a carburetor body and a head by which the shaft may be rotated, a generally tubular open-ended housing surrounding the head of the screw member, a ring member rotatably mounted in the open end of the housing, stop means limiting the angular range of rotation of the ring member relative to the housing, and a plug member rotatably mounted in the ring member and movable relative to the ring member between a first axial position wherein the plug member can rotate independently of the ring member and a second axial position wherein the plug member engages the ring member for co-rotation therewith such that the angular range of rotation of the plug member is limited to the angular range of rotation of the ring member, the plug member engaging the head of the screw member in both the first and second axial positions such that rotation of the plug member effects corresponding rotation of the screw member.

2. A carburetor adjustment screw apparatus according to claim 1, wherein the tubular housing has an internal circumferential step between the head of the screw member and the carburetor body, and the housing is maintained in position surrounding the head of the screw member by a compression spring acting between the head of the screw member and the step.

3. A carburetor adjustment screw apparatus according to claim 1, wherein the stop means comprises cooperating formations on the housing and ring member respectively which abut at each end of the angular range of rotation of the ring member.

4. A carburetor adjustment screw apparatus according to claim 1, wherein the ring member has an internally knurled surface and the plug member has an externally knurled surface, the two knurled surfaces engaging when the plug member is moved to the second axial position so as to lock the plug member and ring member for co-rotation.

5. A carburetor adjustment screw apparatus according to claim 1, wherein the plug member has a dependent flange which engages a slot in the head of the screw member.

6. A carburetor adjustment screw apparatus according to claim 1, wherein one of the plug member and ring member has a pair of axially spaced circumferential formations and the other of the plug member and ring member has a single circumferential formation whose cross-section is complementary to that of each of the pair of circumferential formations, the first axial position of the plug member being defined by the single circumferential formation engaging in one of the pair of circumferential formations and the second axial position of the plug member being defined by the single circumferential formation engaging in the other of the pair of circumferential formations.

* * * * *